Patented Feb. 28, 1950

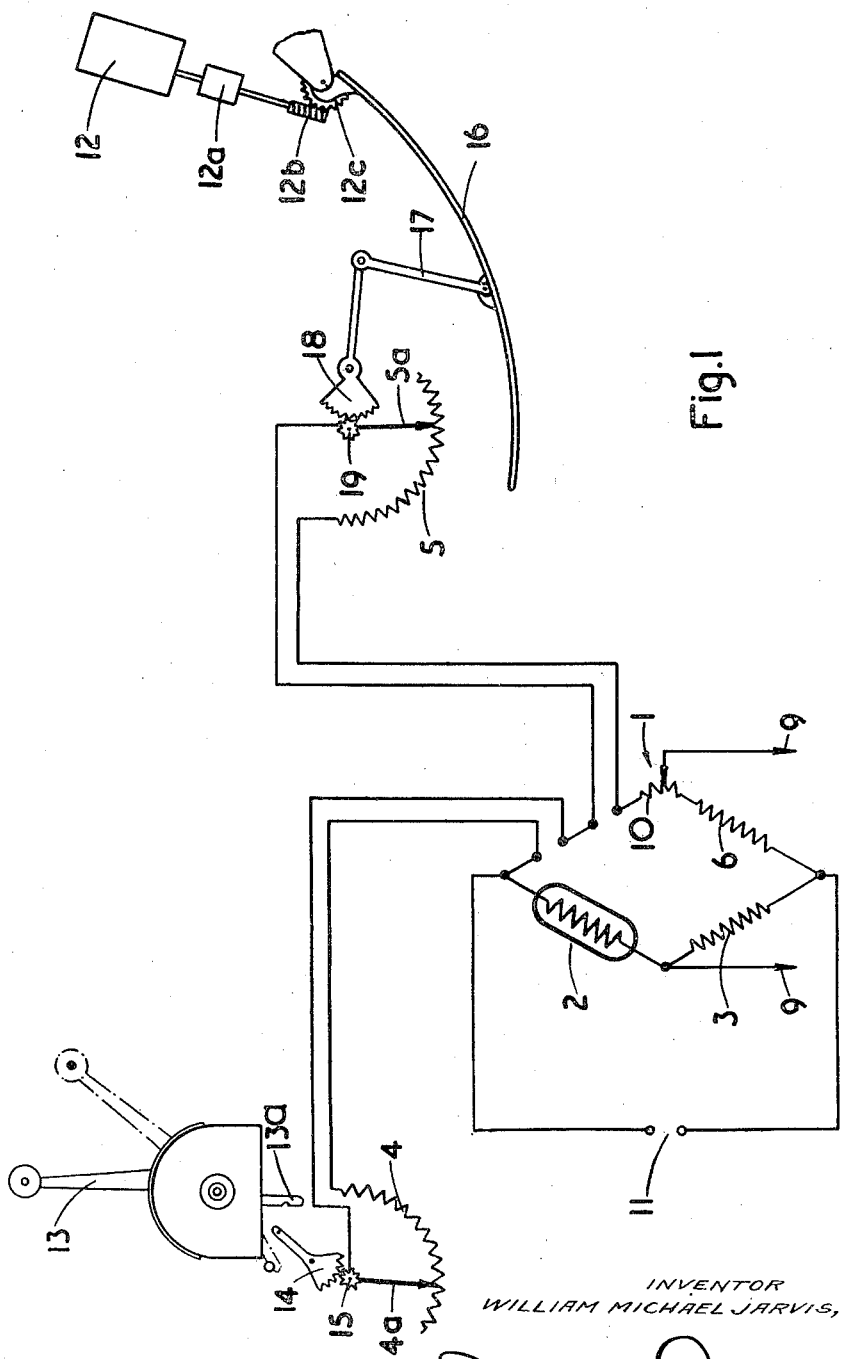

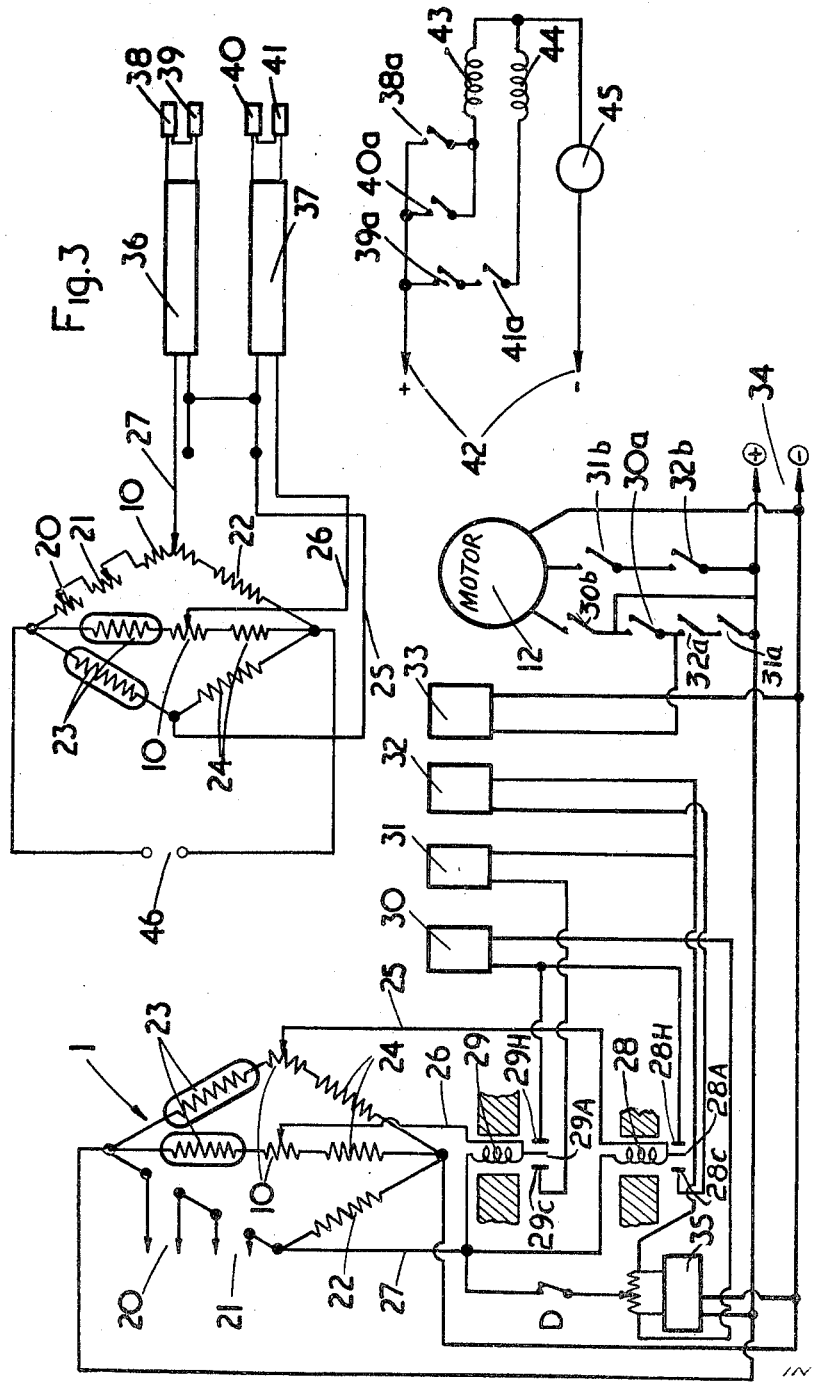

2,499,144

UNITED STATES PATENT OFFICE 2,499,144

MEANS FOR REGULATING THE TEMPERATURE OF INTERNAL-COMBUSTION ENGINES

William Michael Jarvis, Farnborough, England

Application February 27, 1946, Serial No. 650,652
In Great Britain February 28, 1945

7 Claims. (Cl. 123—178)

This invention relates to means for regulating the temperature of an air cooled body, such as an internal combustion engine and particularly an aircraft engine of the type in which a temperature sensitive element, responsive to engine temperatures, controls an electric motor which is adapted to actuate means for obstructing the air flow (hereinafter referred to as flaps) to vary the quantity of cooling air passing through the engine and thus to regulate the temperature thereof.

The object of this invention is to provide improved means for regulating the temperature of the body or engine.

According to one aspect of the invention there is provided means for regulating the temperature of an air cooled body, such as an internal combustion engine, of the kind referred to, wherein the temperature sensitive element forms part of a primary circuit adapted to produce electric signals on change of resistance of the circuit and which circuit is coupled to a secondary or power circuit adapted to control the electric motor actuating the flaps.

The primary circuit advantageously includes means for applying a throttle bias.

According to another aspect of the invention there is provided means for regulating the temperature of an air cooled body, such as an internal combustion engine, comprising a temperature sensitive resistance connected in a primary circuit in parallel with series rheostats, one a throttle controlled rheostat and the other a flap controlled rheostat so that, when the resistance balances the two rheostats, no current will flow in a secondary circuit, but, when the resistance is higher by a predetermined amount than the two rheostats, current will flow in the secondary circuit in one direction and, when the resistance is lower by a predetermined amount than the two rheostats, current will flow in the secondary circuit in an opposite direction, means for causing the secondary circuit current to close selectively one or other of the supply circuits to a split series motor for actuating the flaps and to actuate the flap controlled rheostat to restore the balance of the primary circuit.

The primary circuit, preferably comprises a Wheatstone bridge having the temperature sensitive resistance on one side of the bridge and the throttle controlled rheostat and the flap controlled rheostat on the other side of the bridge circuit.

The regulating means may consist, for example, of a Wheatstone bridge circuit having a temperature sensitive resistance on one side and a throttle controlled rheostat and a flap controlled rheostat on the other side of the bridge circuit adapted when the bridge circuit is unbalanced to cause current to flow in the output or secondary circuit in one direction or the other, according to whether the temperature sensitive resistance decreases or increases relatively to the two rheostats, a moving coil relay in the secondary circuit for differentially operating motor controlling relays, according to the direction of the secondary circuit current; to close a circuit to one or other of the field coils of a split series motor for actuating the flap in an appropriate direction, and for actuating the flap controlled rheostat to re-balance the bridge after the flap has been moved the required amount.

The bridge circuit and the motor are in this case supplied with direct current.

Alternatively, the regulating means may comprise a Wheatstone bridge circuit having a temperature sensitive resistance at one side and a throttle controlled rheostat and a flap controlled rheostat at the other side of the bridge circuit adapted when the bridge circuit is unbalanced by a predetermined amount to cause current to flow in a secondary or output circuit in one direction or the other, according to whether the temperature sensitive resistance increases or decreases relatively to the rheostats, an amplifier in the secondary circuit and a pair of relays, one of which is actuated when the input to the amplifier circuit increases above a predetermined amount in one direction and the other when the input to the amplifier circuit increases above a predetermined amount in the opposite direction, the said relays being connected in the circuits to the field coils of a split series motor for actuating the flaps in the appropriate direction and for actuating the flap controlled rheostat to re-balance the bridge after the flap has been moved the required amount.

In this case the motor may be fed by direct current and the bridge by alternating current, the alternating current being preferably obtained from a valve oscillator. A trimmer resistance is, advantageously, included in the bridge, across which resistance one side of the secondary circuit is adjustable to provide a setting adjustment for the resistances in the bridge circuit.

Since the cylinders in a radial engine are usually at different temperatures when the engine is working and it is not possible to determine reliably which will be the hottest cylinder, it is preferable to arrange for the regulating means to be operated by the hotter of any two cylinders selected as being normally the hottest in the type of engine to which the regulating means are to be applied. For this purpose two Wheatstone bridge circuits may be provided, the secondary circuit of each of which includes a moving coil relay, or an amplifier and associated relays, controlling the flow of current through the split series motor in such a manner that the motor circuits will be closed in such a manner as to cause the motor to increase the opening of the flap when the temperature of the hotter of the two cylinders exceeds a predetermined amount and the motor circuits will be closed in such a manner as to cause the motor to decrease the opening of the flap when the temperature of both of the cylinders falls by a predetermined amount.

Or, advantageously, the two Wheatstone bridge circuits may be combined to form a single bridge having three parallel circuits, one of which contains the two rheostats and the other two of which contain the sensitive resistances.

In order that the invention may be fully understood I shall now describe three embodiments thereof, by way of example, suitable for application to internal combustion engines of the radial cylinder air cooled type wherein the engine is surrounded by a streamlined cowling having a number of adjustable flaps (commonly called gills) arranged at the trailing edge of the cowling, the said flaps being operatively connected in a known manner to an electric motor by which the flaps are open or closed according to the direction of rotation of the motor, by reference to the accompanying diagrammatic drawings, in which:

Figure 1 illustrates a temperature measuring Wheatstone bridge circuit, suitable for operation by a single cylinder of an internal combustion engine and showing the means for controlling the two rheostats by the throttle and the flaps respectively. The secondary or power circuit for operating the flap controlling motor has been omitted from this figure;

Figure 2 is a circuit diagram showing a modified arrangement, adapted for operation by the hotter of two selected cylinders, comprising a primary circuit consisting of a Wheatstone bridge having three parallel circuits having two secondary or output circuits each containing a moving coil relay, and Figure 3 is a circuit showing a further modified arrangement in which each secondary circuit includes an amplifier and a pair of associated relays.

Referring first to the arrangement shown in Figure 1, the numeral 1 indicates generally a Wheatstone bridge circuit constituting the primary circuit of the regulating means. The said bridge comprises two parallel circuits, one circuit consisting of a temperature sensitive resistance 2 in one part and a fixed resistance 3 in the other part, and the other consisting of a throttle controlled rheostat 4 and a flap-controlled rheostat 5 in one part and a fixed resistance 6 in the other part. The output from the bridge 1 is fed to the secondary or power circuit, not shown in the drawing, by leads 9. 10 indicates a trimmer resistance included in the bridge 1 across which resistance one side of the secondary circuit is adjustable to provide a setting adjustment of the resistances in the bridge circuit.

The bridge 1 is supplied from a suitable source of supply 11. A D. C. supply feeds a split series motor 12 for actuating the flaps.

13 denotes the pilot's throttle control lever, an extension 13a of which directly operates the movable contact arm 4a of the rheostat 4 by means of the toothed quadrant 14 and co-operating pinion 15. It may only be necessary to vary the resistance over part of the movement of the lever 13 as shown.

16 indicates a flap, movement of which is effected by the aforesaid motor 12 through a reduction gear box 12a, the work 12b and gear 12c. Movement of the flap 16 is communicated to the rheostat contact arm 5a by means of the linkage 17, and a toothed quadrant 18, engaging the pinion 19.

The above described arrangement operates in the following manner:

When the resistance 2 balances the two rheostats 4 and 5, no current will flow in the secondary circuit, but when the resistance is higher by a predetermined amount than the two rheostats, then current will flow in the secondary circuit in one direction, and when the resistance is lower by a predetermined amount than the two rheostats, current will flow in the secondary circuit in the opposite direction, whereby the split series motor 12 is operated to actuate the flap 16, the movement of which moves the contact arm 5a of the rheostat 5 in a direction to restore the balance of the bridge 1.

Referring now to Figure 2, this figure shows schematically a circuit arrangement, in accordance with the invention, for controlling the flap-actuating motor. which is adapted to be operated during temperature rises by the hotter of any two cylinders of an internal combustion engine selected as being normally the hottest cylinders during the running of the engine, and to be operated to decrease the opening of the flap when the temperature of both cylinders falls by a predetermined amount.

In this case the Wheatstone bridge 1 constituting the primary circuit consists of three parallel circuits, each circuit being divided into two parts, each of which comprises a resistance.

One circuit comprises a throttle controlled rheostat 20 and a flap controlled rheostat 21 (the rheostats have been omitted from the figure and only the connections indicated) in one part and a fixed resistance 22 in the other part. Each of the other circuits consists of a temperature sensitive resistance 23 in one part and a fixed resistance 24 in the other part. These three circuits are connected, as shown, intermediate the fixed and adjustable resistances in the normal manner of Wheatstone bridge circuits with three leads 25, 26 and 27 comprising two secondary circuits. In the circuit 25, 27 is arranged a moving coil relay 28 and in the circuit 26, 27 is a moving coil relay 29. These relays are so arranged as to be rotated when current flows in the respective circuit, the direction of rotation thereof depending on the direction of the current flowing in the secondary circuit, which depends upon whether the temperature of the corresponding cylinder increases or decreases.

The moving coil relay 29 is connected to a relay 30 and a relay 31 which consist of ordinary telephone relays, and the moving coil relay 28 is connected to the relay 30 and a relay 32, which control contacts 30a, 31a and 32a arranged in the supply circuit of the split series motor 12.

Moving coil relay 29 has a moving contact 29A which moves, on heating of its temperature sensitive resistance 23, against contact 29H, and on cooling, against contact 29C. Moving coil relay 28 has similar contacts 28A, 28B and 28C.

Rotation of the moving coil relays 28 and 29 causes the circuit to one or other of the relays 30—31 and 32 to close, whereby current is caused to flow to one or the other of two field windings in the motor depending on the direction of rotation of the moving coil relay.

The current taken by the relays 30, 31 and 32 passes through the moving coil relay and increases the otherwise infinitesimal contact pressure at the moving coil relay contacts, and acts as a holding current for the said relay.

In addition to the three relays 30, 31 and 32 controlling the supply of current to the motor 12, an additional relay 33, connected across the motor supply circuit, is provided. Relay 33 is a governor relay of the time delay moving armature type, in which the moving armature operates a normally closed switch D, so that energization of the relay moves the armature and opens switch D. This relay 33 is operated by energization of relay 30, alone, or by both relays 31 and 32 through contacts 30b, 31b and 32b so as to open the switch D and thus interrupt the holding current passing through the moving coil relay 28 or 29 after a short time interval. If, however, the bridge 1 remains unbalanced, the operation is repeated and the relays 30—33 are arranged to produce a ticking or pulsating current which is supplied to the appropriate field coil of the motor 12, which is thereby driven step by step.

In accordance with the arrangement shown in Figure 1, the motor 12 operates the flap 16, which latter actuates the contact arm 5a of the rheostat 5 in such a manner that, when the flap has been moved a predetermined amount, the rheostat 5 is adjusted to re-balance the bridge 1, when the supply of current to the motor 12 will be cut off.

In this arrangement both the bridge 1 and the motor 12 are operated by direct current from a source of D. C. supply 34.

To increase the direct current voltage for the relay supply, an Ericson vibrator, indicated by the numeral 35, is included.

In the alternative arrangement shown in Figure 3, the primary circuit consists of a similar bridge 1 to that shown in Figure 2, but in this case the two secondary circuits, instead of being fed to moving coil relays are each connected to a separate amplifier 36 and 37 respectively. To the output of the amplifier 36, are connected in series two relays 38 and 39 and to the output of the amplifier 37 are connected in series two relays 40 and 41. One of each of these pairs of relays operates when the potential applied to the pertaining amplifier circuit increases above a predetermined amount in one direction and the other of each pair operates when the potential applied to the amplifier increases above a predetermined amount in the opposite direction. Relays 38, 39, 40 and 41 are the relays of relay operated switches 38a, 39a, 40a and 41a, respectively, and these switches are of the normally open type in which energization of each relay effects closing of the corresponding switch. The said relays 38, 39 respectively operate the switches 38a and 39a, while the relays 40 and 41 respectively operate the switches 40a and 41a and thus control the supply of current through the D. C. mains 42 to the field coils 43, 44 of the split series motor 45. In Figure 3, the switches 38a and 40a operable by the relay 38 and 40 respectively, are arranged in parallel, so that either contact closes the circuit to the motor. These switches 38a and 40a are arranged to close on a rise in temperature of either of the temperature sensitive resistances 23, whilst the switches 39a and 41a operated respectively by the relays 39 and 41, close on a fall in temperature of the resistance 23. In the instance shown, these two switches 39a and 41a are arranged in series, so that a fall in temperature in both cylinders is required to close the circuit of the pertaining field coil. They may, of course, if desired, be arranged in parallel.

With this arrangement, there is a null period in which neither relay operates so that hunting is prevented.

The Wheatstone bridge circuit is supplied with alternating current preferably obtained from a valve oscillator 46, the bridge may be normally operated at a small unbalance of the order of 2 volts in order to provide a constant current in circuit of the relays.

Having now particularly described and ascertained the nature of my said invention and in what manner the same is to be performed, I declare that what I claim is:

1. Automatic temperature regulating apparatus for an internal combustion engine having a throttle and at least one engine temperature controlling flap, comprising a Wheatstone bridge circuit, a resistance in one branch of said circuit variable in response to engine temperature, and second and third variable resistances in a balancing branch of said circuit, said second and third resistances being variable in response to the positions of said throttle and said flap, and electric motor means operable in response to unbalance of said Wheatstone bridge circuit to vary automatically the position of said flap to balance said circuit.

2. Automatic temperature regulating apparatus comprising an adjustable temperature regulating device, an electric motor for adjusting said device and having a control circuit, a delay action governor relay having normally closed contacts, a motor controlling relay arrangement having normally open contacts connected in the motor control circuit and further normally open contacts connected in series with the winding of the governor relay and also having an energising circuit in which the governor relay contacts are connected in series, a bridge circuit including a temperature responsive resistance element in one arm thereof and in another arm thereof a variable resistance coupled with the temperature regulating device for adjustment therewith by the motor and having an output from each of said arms respectively, and, a moving coil relay arrangement having a moving coil connected across said bridge output leads and also in series with normally open contacts thereof in the energising circuit of the motor controlling relay arrangement, whereby upon closing of contacts of the moving coil relay arrangement due to unbalance of the bridge, the energising circuit of the motor controlling relay arrangement is completed and energising current therein, flowing through the moving coil, maintains said contacts closed and actuates the motor controlling relay arrangement to operate the motor and so adjust the temperature regulating device and also the variable resistance coupled with the latter to reduce the unbalance and also to energise the delay action governor relay until the opening of the governor relay contacts breaks the energising circuit of the motor control relay arrangement, whereupon the operation is repeated except when such adjustment of the variable resistance has restored the bridge substantially to balance.

3. Automatic temperature regulating apparatus as claimed in claim 2, wherein the bridge has three arms, two of which include temperature responsive resistance elements and the third of which includes the variable resistance coupled with the temperature regulating device for adjustment therewith by the motor and output leads from each of said arms respectively, and wherein the moving coil arrangement includes two moving coil relays the moving coils of which are connected between the output leads from the two temperature responsive element arms of the bridge, respectively, on the one hand, and the output lead from the variable resistance arm of the bridge, on the other hand.

4. Automatic temperature regulating apparatus as claimed in claim 2, wherein the bridge has three arms, two of which include temperature responsive resistance elements and the third of which includes the variable resistance coupled with the temperature regulating device for adjustment therewith by the motor and output leads from each of said arms respectively, and wherein the moving coil arrangement includes two moving coil relays, the moving coils of which are connected between the output leads from the two temperature responsive element arms of the bridge, respectively, on the one hand, and the output lead from the variable resistance arm of the bridge on the other hand, normally open contacts of the one moving coil relay being connected in series with the moving coil of said one moving coil relay, normally open contacts of the other moving coil relay being connected in series with the moving coil of said other moving coil relay, and both said series connected coils and contacts being connected together in parallel, whilst the motor controlling relay arrangement includes a relay of which the winding is connected in series with the said parallel connected group of coils and contacts of the moving coil relay arrangement in the energizing circuit of the motor controlling relay arrangement, and, said relay of the motor controlling relay arrangement has normally open contacts connected in the motor control circuit and further normally open contacts connected in series with the winding of the delay action governor relay.

5. Automatic temperature regulating apparatus as claimed in claim 2, wherein the bridge has three arms, two of which include temperature responsive resistance elements and the third of which includes the variable resistance coupled with the temperature regulating device for adjustment therewith by the motor and output leads from each of said arms respectively, and wherein the moving coil arrangement includes two moving coil relays the moving coils of which are connected between the output leads from the two temperature responsive element arms of the bridge, respectively, on the one hand, and the output lead from the variable resistance arm of the bridge on the other hand, each of said two moving coil relays having the moving coil and normally open contacts thereof connected in series, and the motor controlling relay arrangement including two relays the winding of one of which latter is connected in series with said moving coil and contacts of one moving coil relay in the energising circuit of the motor controlling relay arrangement and the winding of the other of which two relays is connected in series with said coil and contacts of the other moving coil relay in said energising circuit, whilst each of said two relays has normally open contacts connected in series with those of the other in the motor control circuit and further normally open contacts controlling operation of the delay action governor relay.

6. Automatic temperature regulating apparatus as claimed in claim 2, and having a source of direct current for the energising circuit of the motor controlling relay arrangement said source having a tapping intermediately of the poles thereof, wherein the normally closed governor relay contacts are connected in series with a moving coil of a relay of the moving coil relay arrangement between a moving contact of that relay and the intermediate tapping of the direct current source, said moving coil relay has two spaced fixed contacts one at either side of said moving contact which latter is normally clear of both said fixed contacts, and wherein the motor controlling relay arrangement has two relays the winding of one of which is connected between one pole of the direct current source and one fixed contact of the moving coil relay and the winding of the other of which relays is connected between the other pole of the direct current source and the other fixed contact of the moving coil relay, both said relays of the motor controlling relay arrangement having normally open contacts connected in the motor control circuit and further normally open contacts connected in parallel with one another in series with the winding of the governor relay.

7. Automatic temperature regulating apparatus comprising an adjustable temperature regulating device, a reversible electric motor for adjusting said device and having a control circuit, a delay action governor relay having normally closed contacts, one motor controlling relay having normally open contacts connected in the motor control circuit to operate the motor in one direction and further normally open contacts connected in series with the energising winding of the governor relay, two further motor controlling relays each having normally open contacts connected in series with one another in the motor circuit to operate the motor in the other direction when both are closed and each having further normally open contacts controlling operation of the governor relay, a source of direct current having a tapping intermediately of the two poles thereof, two moving coil relays each having a moving contact connected via the moving coil thereof, and the normally closed governor relay contacts with the intermediate tapping of the direct current source, and each having two fixed contacts disposed one at either side of its moving contact which is normally clear of both fixed contacts, the one motor controlling relay having its winding connected between one pole of the direct current source and two corresponding fixed contacts of the two moving coil relays, respectively, which fixed contacts are connected together, and the two further motor controlling relays having their windings connected between the other pole of the direct current source on the one hand and the other two fixed contacts of the two moving coil relays, respectively, on the other hand, and, a bridge circuit having three arms two of which include temperature responsive resistance elements and the third of which includes a variable resistance coupled with the temperature regulating device for adjustment therewith by the motor and three output leads one from each of said arms respectively, the moving coils of the two moving coil relays being connected between the output lead from the third output arm of the bridge on the one hand and the other two bridge output leads, respectively, on the other hand.

WILLIAM MICHAEL JARVIS.

REFERENCES CITED

The following references are of record in the file of this patent:

UNITED STATES PATENTS

| Number | Name | Date |
|---|---|---|
| 1,325,054 | Stout | Dec. 16, 1919 |
| 1,443,465 | Fulton | Jan. 30, 1923 |
| 1,500,418 | Page et al. | July 8, 1924 |
| 1,895,701 | Brown | Jan. 31, 1933 |
| 2,403,917 | Gille | July 16, 1946 |